Sept. 23, 1941.     H. E. MORROW     2,257,062
ENGINE SHUTDOWN DEVICE
Filed Feb. 27, 1941     2 Sheets-Sheet 1

Inventor
HARRY E. MORROW, DECEASED,
BY GERTRUDE M. MORROW, EXECUTRIX

Attorney

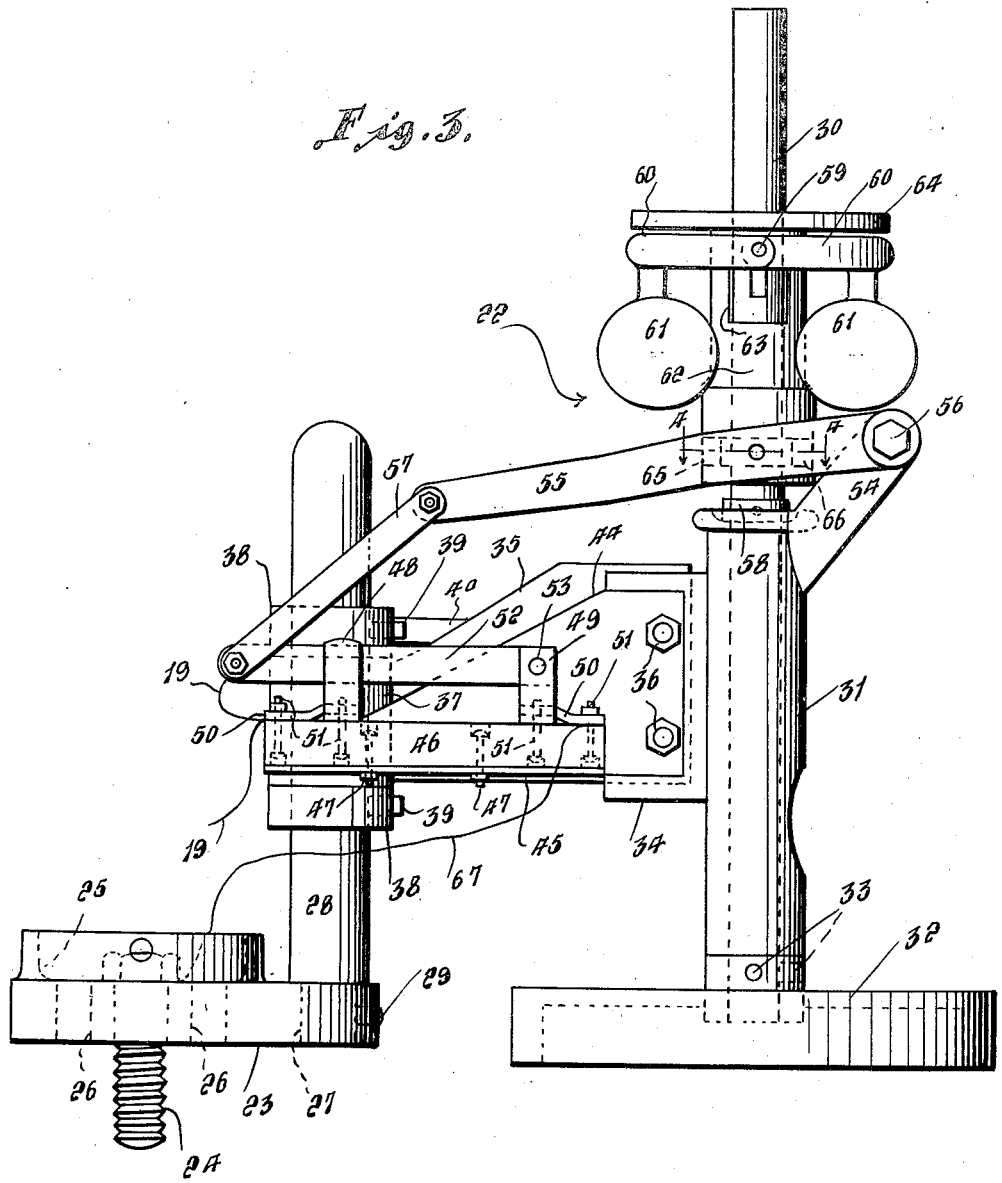

Patented Sept. 23, 1941

2,257,062

UNITED STATES PATENT OFFICE 2,257,062

ENGINE SHUTDOWN DEVICE

Harry E. Morrow, deceased, late of Electra, Tex., by Gertrude M. Morrow, executrix, West Los Angeles, Calif.

Application February 27, 1941, Serial No. 380,932

6 Claims. (Cl. 192—116.5)

This invention relates to a device for use with oil field belt driven power operated by internal combustion engines to provide a shut-off attachment which will function automatically to shut-off the ignition to the engine in case of failure of the belt or clutch, or for any other reason that might stop the driven machinery.

More particularly, it is an aim of the invention to provide a device adapted to be driven by frictional engagement with a driven belt tightener pulley, and which is operated by centrifugal force including a switch which is held open when the belt is being driven at a proper speed, but which will be closed when the speed of the belt diminishes beyond a certain point for grounding out the current to the engine.

Still another aim of the invention is to provide a device which may be readily mounted on the stationary shaft of conventional belt tightener pulleys and having a friction wheel for frictionally engaging the belt tightener pulley and provided with spring means for yieldably holding the wheel in engagement with the pulley.

Still a further aim of the invention is to provide a device having means for adjustably mounting the friction wheel relatively to the stationary shaft and to the rim of the pulley.

Figure 1:
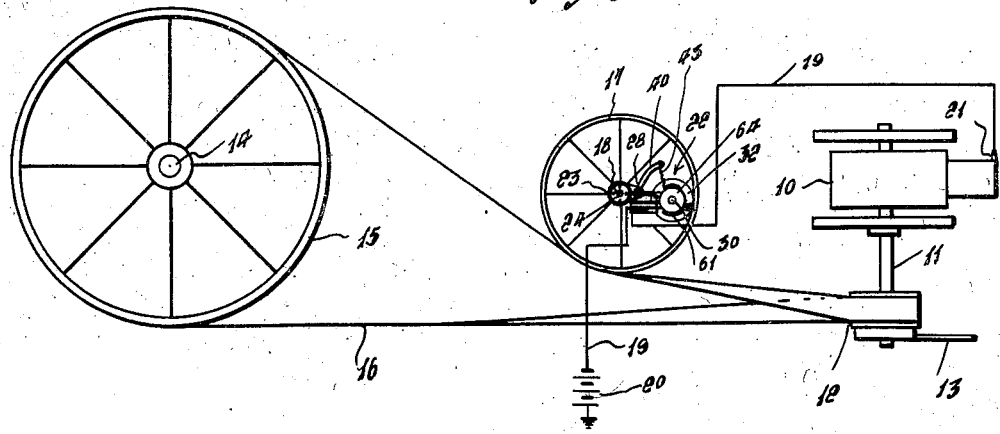
Figure 2:
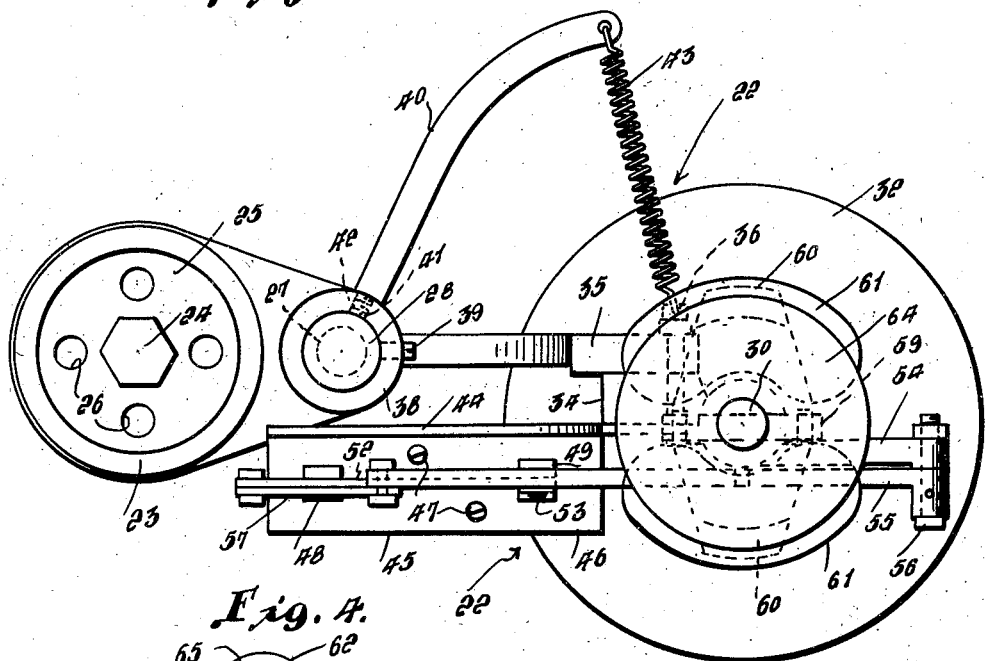
Figure 4:
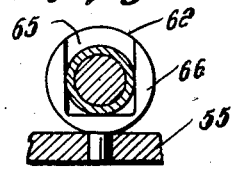

Other objects and advantages of the invention will hereinafter become more fully apparent from the following description of the drawings, which illustrate a preferred embodiment thereof, and wherein:

Figure 1 is a top plan view showing the invention applied to a conventional belt tightener pulley, Figure 2 is an enlarged top plan view of the engine shut down device, comprising the invention, Figure 3 is a side elevational view of the same, and Figure 4 is a cross sectional view taken substantially along the plane of the line 4—4 of Figure 3.

Referring more particularly to the drawings, wherein like reference characters designate like or corresponding parts throughout the different views, and referring particularly to Figure 1, 10 designates generally a conventional gasoline engine, the crankshaft 11 of which is provided with a pulley 12 and a supporting bearing 13 in which its free end is journaled. A power take-off shaft 14 is provided with a pulley 15 which is adapted to be driven by a belt 16 which is trained over the pulleys 12 and 15 and which is provided with a belt tightener pulley 17 which is journaled on a fixed shaft 18. An electrical conducting wire 19 leads from a source of electric current 20 to the ignition system of the engine 11 which is indicated by the spark plug 21. These parts are all of conventional construction and form a conventional assembly and are illustrated and described merely to illustrate the application of the engine shut down device, designated generally 22 and comprising the invention.

The engine shut down device 22 includes a base member 23 which is adapted to fit an end of the stationary shaft 18 and which is provided with a bolt 24 for detachably connecting it thereto. The base 23 is constructed to replace a conventional oil basin, not shown, which is usually mounted on the upper end of the shaft 18. The base 23 is provided with an oil basin 25 in its top and with oil ports 26 which communicate with the bottom of the basin 25 and which extend downwardly through the base 23. Base 23 is provided with an extension having a perpendicular opening 27 for receiving the restricted end of a post 28 which is adapted to be detachably secured therein by means of a set screw 29.

A shaft 30 is journaled in a bearing 31. A friction wheel 32 is keyed by means of a set screw 33 to the lower end of the shaft 30. The periphery of the wheel 32 is preferably formed of brake lining or belting, not shown, for a purpose which will hereinafter become apparent. The bearing 31 is provided with a lateral extension 34. A bracket 35 has one end disposed on one side of the extension 34 and secured thereto by fastenings 36. The bracket 35, at its opposite end, is provided with a sleeve 37 which is disposed substantially parallel to the bearing 31 and which is adapted to loosely engage the post 28. The sleeve 37 is adjustably supported longitudinally of the post 28 by means of collars 38 which are mounted on the post 28 above and beneath the sleeve 37 and which are provided with set screws 39 for retaining the collars 38 in adjusted positions relatively to the post 28 and to thereby adjustably support the bracket 35 relatively to the post 28. The collars 38 do not tightly engage the ends of the sleeve 37 in order to permit the sleeve to turn freely on the post 28. As best seen in Figure 2, an arm 40 is provided with a restricted threaded end 41 for engaging a threaded opening 42 in the upper collar 38. The arm 40 projects from the post 28 at an oblique angle to the supporting bracket 35 and is provided with a curved free end which is curved toward the bearing 31 but which terminates in spaced apart relationship thereto. A contractile coil spring 43 has one end secured to an opening in the free end of the arm 40 and its opposite end secured in an opening in the head of one of the bolts of one of the nut and bolt fastenings 36. The expansion coil spring 43 is anchored by the arm 40 and urges the bearing 31 and the wheel 32 to swing relatively to the post 28 in a counterclockwise direction, as seen in Figures 1 and 2, for a purpose which will hereinafter become apparent.

A supporting bracket 44 is attached at one end thereof to the opposite side of the extension 34 by means of the fastenings 36 and extends therefrom in the same direction as the bracket 35 and is disposed substantially parallel thereto and in spaced apart relationship not only to the bracket 35 but also to the sleeve 37, as best seen in Figure 2. The supporting bracket 44 is provided with a flange or shelf 45 which projects laterally from its lower edge and away from the bracket 35. A block of electrical insulating material 46 is secured by means of fastenings 47 to the upper side of the flange or shelf 45. A pair of contacts 48 and 49 are mounted on the block 46 and include conducting strips 50. The contacts 48 and 49 and their conducting strips 50 are secured to the block 46 by fastenings 51 which are embedded in the block, as best seen in Figure 3, to insulate the contact 48 and its conducting strip 50 from the contact 49 and its conducting strip 50. Each of the contacts 48 and 49 comprises a pair of spaced bars. A switch blade 52 is pivotally mounted by means of a pin 53 at one end thereof between the bars of the contact 49 and is adapted, when in a closed position to have its intermediate portion disposed between and engaging the bars of the contact 48 to combine with said contacts to form a conventional knife blade type of switch.

The bearing 31, on the opposite side thereof to the extension 34, is provided with a supporting arm 54 which projects upwardly and outwardly therefrom, adjacent its upper end and at substantially an oblique angle thereto. A lever 55 is pivotally connected at one of its ends by means of a bolt and nut 56 to the upper, free end of the arm 54 and on one side thereof. The lever 55 extends toward the post 28 and is disposed on one side of and in spaced apart relationship to the shaft 30. A link 57 is pivotally connected at one end thereof to the opposite free end of the lever 55 and is pivotally connected at its opposite end to the free end of the blade 52. A collar 58 is secured to the shaft 30 and engages the upper end of the bearing 31 to combine with the wheel 32 to prevent the shaft 30 from sliding relatively to the bearing 31.

As best seen in Figure 3, the shaft 30 extends substantially above the bearing 31 and is provided adjacent its upper end with a pin 59 which extends transversely therethrough and substantially beyond the periphery thereof and on the free ends of which are pivotally mounted pairs of arms 60 which normally project transversely from the shaft 30 and which are provided with depending free ends terminating in weights 61. The sleeve 62 is slidably mounted on the upper portion of the shaft 30 and is provided with a bifurcated upper end forming opposed slots 63 through which the ends of the pin 59 extend. The furcations of the upper end of the sleeve 62 project upwardly between the arms 60 which project in corresponding directions. A flanged head 64 is connected to the upper bifurcated end of the sleeve 62 and rests on the upper edges of the arms 60. The weights 61 normally engage against the sleeve 62 for supporting the arms 60 in substantially a horizontal position so that the arms 60 can in turn support the sleeve 62. It will be obvious that the sleeve 62 will be caused to rotate with the shaft 30 as it will be keyed thereto by means of the ends of the pin 59. The sleeve 62, adjacent its lower end, is provided with an annular groove 65 for receiving the legs of a fork 66, the shank of which is secured in the lever 55.

From the foregoing it will be obvious that with the shut down device 22 mounted on the upper end of the shaft 18, as previously explained, the periphery of the friction wheel 32 will be positioned for frictionally engaging the inner side of the rim of the pulley 17. Due to the fact that the extension 34 is attached to one side of the bracket 35, the axis of the shaft 30 is offset relatively to the bracket 35 and to the axis of the post 28 and the spring 43 is arranged to urge the shaft 30 in a direction so that it will move in an arc outwardly of or away from the post 28 and consequently toward the rim of the pulley 17 to hold the wheel 32 in frictional engagement therewith. The tension of the spring 43 can obviously be varied by turning the upper collar 38 relatively to the post 28 to swing the arm 40 toward or away from the shaft 30. As best seen in Figure 3, the wire 19 is connected to the conducting strip 50 of the contact 48 and a wire 67 is connected to the contact strip 50 of the contact 49 and is connected to the bolt 24 to be thereby grounded on the shaft 18.

When the engine 11 is not in operation the parts of the shut-off device 22 will assume the positions, as seen in Figure 3. In starting the engine 11 the wire 67 is disconnected. The engine 11 drives the belt 16 in a conventional manner to revolve the belt tightener pulley 17 to thereby revolve the wheel 32 and its shaft 30. This will cause the weights 61 to be swung outwardly by centrifugal force to cause the arms 60 to be swung upwardly to bear against the head 64 to raise sleeve 62. The lever 55 through its connection with the sleeve 62 by the forked member 66, which is mounted so that the sleeve 62 can turn freely relatively thereto, will be swung upwardly to thereby swing the blade 52 upwardly through the link connection 57. This will break the connection between the contacts 48 and 49 and the ground wire 67 can then be connected to form a conductor from the contact 49 to the grounded shaft 18. Should the belt 16 break or should the power take-off shaft 14 for any other reason cease to revolve, resulting in a stoppage of the movement of the belt 16 or in substantially slowing down its speed of movement, the speed of rotation of the pulley 17 will be reduced sufficiently to reduce the speed of rotation of the shaft 30 and the wheel 32 so that the weights 61 will no longer be supported by centrifugal force and will therefore swing downwardly to permit the sleeve 62 to resume its lowered position, as seen in Figure 3, to cause the lever 55 to swing downwardly and to thereby return the blade 52 to its position, as seen in Figure 3, in engagement with the contacts 48 and 49. This will cause the current from the source 20 to pass from the conductor wire 19 through contact 48, blade 52, contact 49 and the ground wire 67 and be grounded on the shaft 18, instead of passing to the plug 21 due to the fact that the current will ground itself through the wire 67 rather than sparking against the engine compression.

Various modifications and changes are contemplated and may obviously be resorted to as only a preferred embodiment of the invention has been disclosed.

What is claimed is:

1. An engine shut down device comprising a wheel adapted to be driven by frictional engagement with a belt tightener pulley, a shaft keyed to said wheel, a bearing for journaling the shaft and for supporting the shaft and wheel, arms pivotally connected to the shaft and provided with weights at their free ends adapted to be swung upwardly and outwardly by centrifugal force when the shaft is revolved, a sleeve slidably mounted on said shaft and having a flange for engaging said arms to cause the sleeve to be moved lengthwise of the shaft by the outward movement of said weights, a switch having spaced contacts insulated from one another, one of said contacts being connected to a wire leading from a source of electric current to the ignition system of an internal combustion engine which drives a belt which, in turn, drives the belt idler pulley, the other contact being connected to a grounded wire, a blade, forming a part of said switch and pivotally connected to one of the contacts and arranged to engage the other contact when in a closed position, and means pivotally connected to the opposite end of said blade and turnably connected to said sleeve for retaining the blade in an open position when the shaft is revolved sufficiently to hold the weights in a raised position, and said means being movable by the weights when the shaft ceases to revolve to cause the blade to engage both of the contacts for grounding the current through the last mentioned contact to stop the engine.

2. A device as in claim 1, comprising a support connected to a stationary shaft on which the belt tightener pulley is journaled for adjustably and detachably supporting said bearing.

3. A device as in claim 1, comprising means for supporting said bearing, said bearing being turnably mounted on said supporting means for swingably mounting the wheel and shaft, and spring means connected to the bearing for urging it to move in a direction to retain the wheel in frictional engagement with the belt tightener pulley.

4. A device as in claim 1, comprising a base member adapted to be connected to a stationary shaft on which the belt tightener pulley is journaled, a post secured to and rising from the base member, said bearing having an extension arm provided with a sleeve at its free end for loosely engaging the post, collars adjustably connected to the post for adjustably supporting the bearing relatively thereto, an arm projecting from one of said collars at an oblique angle to said extension arm, and a contractile coil spring connected at one end to the bearing and at its opposite end to the free end of said arm for urging the bearing to swing in one direction relatively to the post for moving the wheel into frictional engagement with the belt tightener pulley.

5. An engine shut down device for use with internal combustion engines for driving belts employed as power transmitting means and having belt tightener pulleys, comprising a switch having spaced contacts and a pivotally mounted blade for bridging the contacts when in a closed position, one of said contacts being connected to an electrical conducting wire leading from a source of electric current to the internal combustion engine, the other of said contacts being connected to a grounded wire, a wheel driven by frictional engagement with the belt tightener pulley of the belt driven by said engine, a shaft driven by said wheel, weights connected to said shaft and adapted to be moved by centrifugal force relatively thereto when the shaft is revolved, and means actuated by said weights and connected to said blade for moving it out of engagement with one of said contacts when the shaft is revolved and for returning it into engagement with both of the contacts when the shaft ceases to revolve.

6. A device as in claim 5, comprising spring means for yieldably holding the wheel in frictional contact with the belt tightener pulley.

GERTRUDE M. MORROW,
*Executrix of the Estate of Harry E. Morrow, Deceased.*